(12) United States Patent
Craddock et al.

(10) Patent No.: US 7,899,050 B2
(45) Date of Patent: Mar. 1, 2011

(54) LOW LATENCY MULTICAST FOR INFINIBAND® HOST CHANNEL ADAPTERS

(75) Inventors: David Craddock, New Paltz, NY (US); Thomas A. Gregg, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 236 days.

(21) Appl. No.: 11/855,479

(22) Filed: Sep. 14, 2007

(65) Prior Publication Data

US 2009/0073978 A1   Mar. 19, 2009

(51) Int. Cl.
*H04J 1/16* (2006.01)
*H04L 12/56* (2006.01)

(52) U.S. Cl. .......... 370/390; 370/238; 370/432; 709/238
(58) Field of Classification Search ................... 370/238, 370/239, 389, 390, 432, 237; 709/238
See application file for complete search history.

(56) References Cited

U.S. PATENT DOCUMENTS

| | | | |
|---|---|---|---|
| 6,947,437 B1 | 9/2005 | Erimli et al. | |
| 7,016,299 B2* | 3/2006 | Kashyap | 370/218 |
| 7,110,359 B1 | 9/2006 | Acharya | |
| 7,245,627 B2 | 7/2007 | Goldenberg et al. | |
| 7,428,598 B2* | 9/2008 | Arndt et al. | 709/250 |
| 7,477,639 B2 | 1/2009 | Shimizu et al. | |
| 7,493,409 B2* | 2/2009 | Craddock et al. | 709/238 |
| 2003/0031183 A1 | 2/2003 | Kashyap et al. | |
| 2003/0033426 A1 | 2/2003 | Beukema et al. | |
| 2004/0066791 A1* | 4/2004 | Wu et al. | 370/419 |
| 2004/0202189 A1 | 10/2004 | Arndt et al. | |
| 2004/0215848 A1 | 10/2004 | Craddock et al. | |
| 2004/0218623 A1 | 11/2004 | Goldenberg et al. | |
| 2005/0018669 A1 | 1/2005 | Arndt et al. | |
| 2005/0100033 A1 | 5/2005 | Arndt et al. | |
| 2005/0144313 A1 | 6/2005 | Arndt et al. | |
| 2006/0031565 A1 | 2/2006 | Iyer et al. | |
| 2006/0067346 A1 | 3/2006 | Tucker et al. | |
| 2006/0129699 A1 | 6/2006 | Kagan et al. | |
| 2006/0221989 A1* | 10/2006 | Basso et al. | 370/412 |
| 2008/0168194 A1 | 7/2008 | Gregg et al. | |
| 2008/0267203 A1 | 10/2008 | Curcio et al. | |
| 2008/0273539 A1* | 11/2008 | Basso et al. | 370/395.32 |
| 2009/0073999 A1 | 3/2009 | Craddock et al. | |
| 2009/0077567 A1 | 3/2009 | Craddock et al. | |

OTHER PUBLICATIONS

Infiniband Architecture Specification vol. 1, Rel. 1.2, Oct. 2004.
RDMA Protocol Specification (Version 1.0) Oct. 2002.
USPTO U.S. Appl. No. 11/855,562, filed Sep. 14, 2007, David Craddock et al., Office Action dated Jun. 14, 2010.
USPTO U.S. Appl. No. 11/855,453, filed Sep. 14, 2007, David Craddock et al., Office Action dated Aug. 5, 2009.
USPTO U.S. Appl. No. 11/855,453, filed Sep. 14, 2007, David Craddock et al., Notice of Allowance dated Dec. 17, 2009.

* cited by examiner

*Primary Examiner* — John Pezzlo
(74) *Attorney, Agent, or Firm* — Steven Chiu

(57) ABSTRACT

A low latency multicasting receive and send apparatus and method comprising low latency receive and send queues. In an InfiniBand® network each destination group of nodes (recipients) is identified by a unique Global ID (GID)+Local ID (LID). Each node whose ports are part of a multicast group identify themselves via a LID which identifies participating ports. When a switch receives such a multicast packet with a multicast LID in the packet's DLID field it replicates the packet to each of the designated ports. Each destination adapter at a receiving node receives the multicast packet and distributes copies of the packet to QPs in the host system that are registered for the multicast address.

18 Claims, 12 Drawing Sheets

LOW LATENCY MULTICAST FOR INFINIBAND® HOST CHANNEL ADAPTERS

BACKGROUND OF THE INVENTION

1. Technical Field of the Invention

This invention pertains to computer system communication. In particular, this invention provides low latency message reception and replication in an InfiniBand® multicast implementation.

2. Description of the Related Art

I/O adapters define queue pairs (QPs), comprising receive queues (RQ) and send queues (SQ), for conveying messaging information from a software consumer to the adapter prior to transmission over a network fabric and for receiving messages by the consumer from an adapter coupled to the network fabric. Industry standards, such as the InfiniBand® (IB) Architecture Specification available from the InfiniBand® Trade Association and IWarp from the RDMA Consortium, specify that the message information carried on QPs is in the form of a work queue element (WQE) that carries control information pertaining to the message. The above-identified documents are incorporated herein by reference in their entirety. Also, one or more data descriptors point to the message data to be transmitted or the location at which received messages are to be placed.

Low latency message passing is a critical function in high performance computing applications. Typical data exchanges between system memory and InfiniBand® adapters that are required to receive messages consume sizeable amounts of time.

Some RQ applications have a need to reduce the latency incurred during data transfer operations. There is a need for a mechanism to enhance the standard RQ operations so that the lower latencies required by these applications can be achieved.

Multicasting refers to sending a message or messages from a single source to many destinations. With reference to FIG. 7, there is illustrated a number of InfiniBand® nodes 701, 702, 703, coupled to switch/router 710 wherein each destination node or group of nodes (recipients) is identified by a unique Multicast Global ID (GID) in the header of a multicast packet. Switches forward to one or more output ports based on the LID (Local ID), and routers forward based on the GID (Global ID). Each node whose ports (P) are part of a multicast group identify themselves via a Multicast GID. Network management functions keep track of nodes and their ports that will receive targeted multicast messages. This information is distributed to IB network routers and switches, such as 710, for storage in routing tables. Thereby, each switch is configured with routing information for the multicast traffic which specifies all of the ports 711 where the packet needs to be forwarded.

The sender, e.g. 712, uses a multicast LID and GID in all packets it sends to a targeted multicast group. In the example illustrated in FIG. 7, the sender is a processor 712 in a host system or node 701, which owns and manages its own QP 713. The illustration of FIG. 7 is not intended to limit the number of processors or host channel adapters that can be implemented in the present invention. Preferably, the host system can include thirty-two processors, for example, with any number of such processors sharing one or more host channel adapters. When a switch 710 receives such a multicast packet with a multicast LID in the packet's DLID field it replicates the packet and sends copies of the packet to each of the designated ports 711. A router uses a DGID to determine which ports to forward the packet to. The GID is used to identify the multicast group and the QPs that are associated with it (i.e. 704, 705, 706). IB multicast spreads the load of replicating packets across switches, routers, and HCAs in the network fabric. As the network scales, so does the replication.

SUMMARY OF THE INVENTION

As described below in greater detail, each destination Host Channel Adapter (HCA), e.g. 707, 708 at a receiving host or node receives the multicast packet and replicates and distributes copies of the packet to QPs in the host system that are registered for the multicast address. A single QP can be registered for multiple addresses for the same port but if a consumer wishes to receive multicast traffic on multiple ports it needs a different QP for each port. The host channel adapter recognizes a multicast packet by the packet's DLID in its header and by the special value in the packet's Destination QP field and routes the packet to the QPs registered in the multicast group for that address and port.

The prior art provides the ability to store variable length receive messages and completion information on a single receive queue in system memory which provides an extremely efficient mechanism for system software to poll received messages and identify their source. It also provides the standard InfiniBand® protection mechanisms in hardware.

An object of the present invention is to provide a computer system with receive queues implemented in host system memory whereby the message data and work completion information are provided to the system in a single transfer over the processor local bus. The completion information can comprise standard IB completion information. The primary method and structure by which the present inventive embodiment achieves low latency reception is to minimize communication back and forth between the hardware adapter and memory.

Another object of the present invention is a hardware adapter coupled to the host system and to a network fabric for transferring data messages. The adapter comprises a QP Context identifying RQ status, storage buffers, etc. The host system receives data transfers from the adapter comprising Completion Queue Element (CQE) information and payload data. An embodiment of the present invention comprises CQEs as the work completion information. The adapter receives network packets each containing header information sufficient for the adapter to build a corresponding data message to the system comprising the CQE information and data, and also to provide the standard protection checks required by the IB architecture.

For a reliable connected transport service each node requires a QP. That type of configuration starts to breakdown with large clusters because of the demand on memory for the number of QPs required. A single LL RQ implementation in system memory according to the present invention provides better cache coherency, less memory usage, and less resources required by receiving packets from thousands of nodes onto a single LL RQ.

The host system includes a receive queue for storing received data messages from the adapter until they are processed by the host system. The receive queue includes a plurality of uniformly sized slots equivalent to the size of a single cache line as architected in the host system. A received data message can occupy one or more slots in the receive queue, however, each data message begins on a slot boundary with its CQE portion, followed by the data portion. The tail pointer information in the QP Context table indicates to the adapter a memory location of a next available slot in the receive queue.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications. The above as well as additional objectives, features, and advantages of the present invention will become apparent in the following written description.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1:
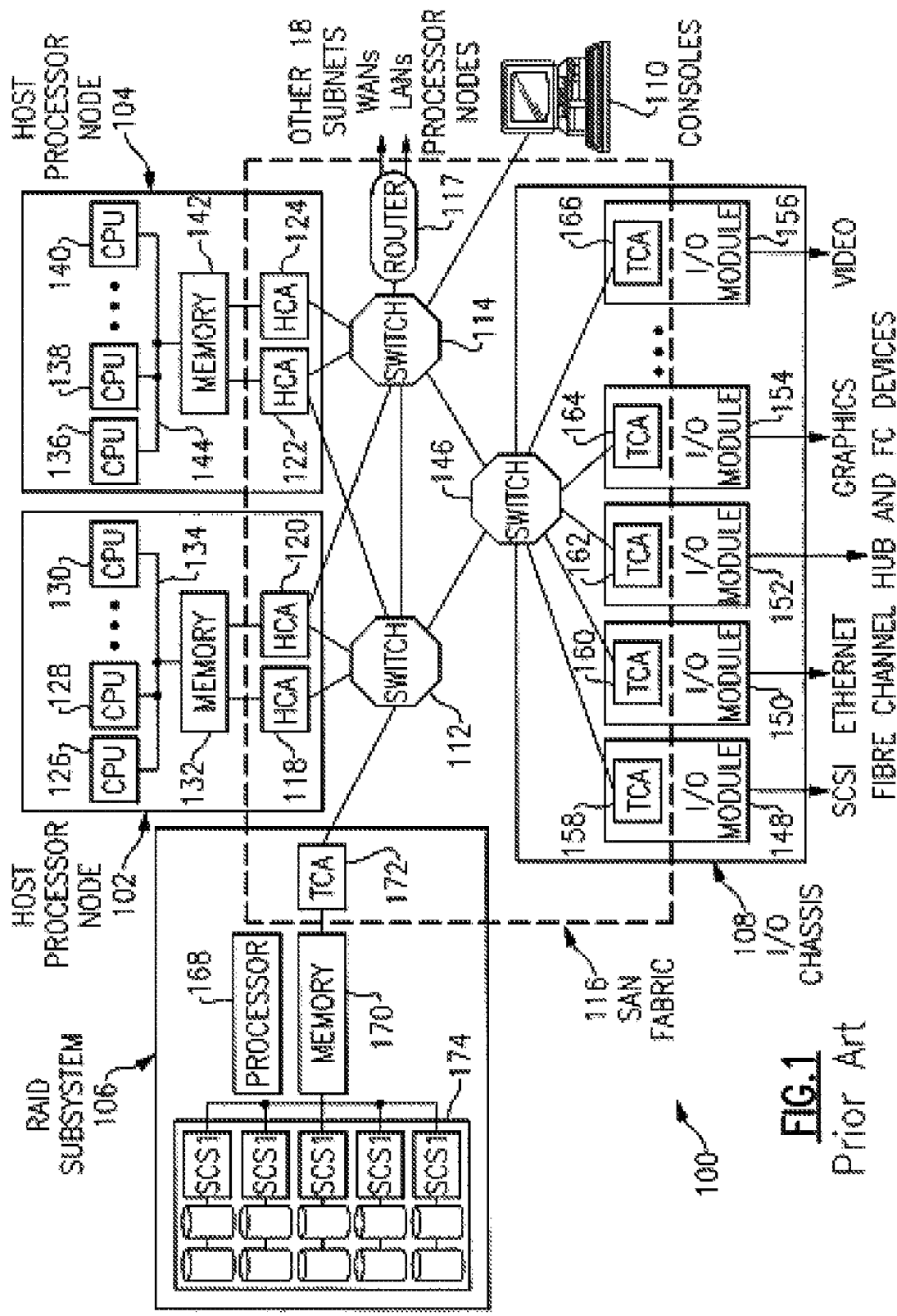
FIG. 1 is a prior art diagram of a distributed computer system that is an exemplary operating environment for embodiments of the present invention.

FIG. 1 is a prior art diagram of a distributed computer system where exemplary embodiments may be implemented. The distributed computer system represented in FIG. 1 takes the form of a System Area Network (SAN) 100 and is provided merely for illustrative purposes. Exemplary embodiments of the present invention described below can be implemented on computer systems of numerous other types and configurations. For example, computer systems implementing the exemplary embodiments can range from a small server with one processor and a few input/output (I/O) adapters to massively parallel supercomputer systems with hundreds or thousands of processors and thousands of I/O adapters.

Referring to FIG. 1, a SAN 100 is a high-bandwidth, low-latency network for interconnecting nodes within a distributed computer system. A node is any component attached to one or more links of a network and forming the origin and/or destination of messages within the network. In the example depicted in FIG. 1, the SAN 100 includes nodes in the form of host processor node 102, host processor node 104, redundant array independent disk (RAID) subsystem node 106, and I/O chassis node 108. The nodes illustrated in FIG. 1 are for illustrative purposes only, as SAN 100 can interconnect any number and any type of independent processor nodes, I/O adapter nodes, and I/O device nodes. Any one of the nodes can function as an end node, which is herein defined to be a device that originates or finally consumes messages or packets in SAN 100. In exemplary embodiments, an error handling mechanism in distributed computer systems is present in which the error handling mechanism allows for reliable connection and/or reliable datagram communication between end nodes in distributed computing systems, such as SAN 100.

A message, as used herein, is an application-defined unit of data exchange, which is a primitive unit of communication between cooperating processes. A packet is one unit of data encapsulated by networking protocol headers and/or trailers. The headers generally provide control and routing information for directing the packet through SAN 100. The trailer generally contains control and cyclic redundancy check (CRC) data to verify that packets are not delivered with corrupted contents.

The SAN 100 depicted in FIG. 1 contains the communications and management infrastructure supporting both I/O and interprocessor communications (IPC) within a distributed computer system. The SAN 100 shown in FIG. 1 includes a switched communications fabric 116, which allows many devices to concurrently transfer data with high-bandwidth and low-latency in a secure, remotely managed environment. End nodes can communicate over multiple ports and utilize multiple paths through the SAN fabric. The multiple ports and paths through the SAN shown in FIG. 1 can be employed for fault tolerance and increased bandwidth data transfers.

The SAN 100 in FIG. 1 includes three switches 112, 114, and 146, and router 117. A switch is a device that connects multiple links together and allows routing of packets from one link to another link within a subnet using a small header destination local identifier (DLID) field. A router is a device that connects multiple subnets together and is capable of routing packets from one link in a first subnet to another link in a second subnet using a large header destination globally unique identifier (DGUID).

In one embodiment, a link is a full duplex channel between any two network fabric elements, such as end nodes, switches, or routers. Example suitable links include, but are not limited to, copper cables, optical cables, and printed circuit copper traces on backplanes and printed circuit boards.

For reliable service types, end nodes, such as host processor end nodes and I/O adapter end nodes, generate request packets and return acknowledgment packets. Switches and routers pass packets along, from the source to the destination. Except for the variant CRC trailer field, which is updated at each stage in the network, switches pass the packets along unmodified. Routers update the variant CRC trailer field and modify other fields in the header as the packet is routed.

In SAN 100 as illustrated in FIG. 1, host processor node 102, host processor node 104, and I/O chassis 108 include at least one channel adapter (CA) to interface to SAN 100. In exemplary embodiments, each CA is an endpoint that implements the CA interface in sufficient detail to source or sink packets transmitted on SAN fabric 116. Host processor node 102 contains CAs in the form of Host Channel Adapters (HCAs) 113 and 120. Host processor node 104 contains HCAs 122 and 124. Host processor node 102 also includes central processing units 126-130 and a memory 132 interconnected by bus system 134. Host processor node 104 similarly includes central processing units 136-140 and a memory 142 interconnected by a bus system 144. HCAs 118 and 120 provide a connection from host processor node 102 to switch 112; while HCAs 122 and 124 provide a connection from host processor node 104 to switches 112 and 114.

In exemplary embodiments, an HCA is implemented in hardware. In this implementation, the HCA hardware offloads much of the central processing unit I/O adapter communication overhead. This hardware implementation of the HCA also permits multiple concurrent communications over a switched network without the traditional overhead associated with communication protocols. In one embodiment, the HCAs and SAN 100 in FIG. 1 provide the I/O and IPC consumers of the distributed computer system with zero processor-copy data transfers without involving the operating system kernel process, and employs hardware to provide reliable, fault tolerant communications.

As indicated in FIG. 1, router 117 is coupled to wide area network (WAN) and/or local area network (LAN) connections to other hosts or other routers. The I/O chassis 108 in FIG. 1 includes an I/O switch 146 and multiple I/O modules 148-156. In these examples, the I/O modules 148-156 take the form of adapter cards. Example adapter cards illustrated in FIG. 1 include a SCSI adapter card for I/O module 148, an adapter card to fibre channel hub and fibre channel arbitrated loop (FC-AL) devices for I/O module 152; an Ethernet adapter card for I/O module 150; a graphics adapter card for I/O module 154; and a video adapter card for I/O module 156. Any known type of adapter card can be implemented. I/O adapters also include a switch in the I/O adapter to couple the adapter cards to the SAN fabric. These modules contain target channel adapters (TCAs) 158-166. In the example depicted in FIG. 1, the RAID subsystem node 106 includes a processor 168, a memory 170, a TCA 172, and multiple redundant and/or striped storage disk units 174. TCA 172 can be a fully functional HCA.

SAN 100 handles data communications for I/O and interprocessor communications. SAN 100 supports high-bandwidth and scalability required for I/O and also supports the extremely low latency and low CPU overhead required for interprocessor communications. User clients can bypass the operating system kernel process and directly access network communication hardware, such as HCAs, which enable efficient message passing protocols. SAN 100 is suited to current computing models and is a building block for new forms of I/O and computer cluster communication. Further, SAN 100 in FIG. 1 allows I/O adapter nodes to communicate with each other or to communicate with any of the processor nodes in distributed computer systems. With an I/O adapter attached to the SAN 100 the resulting I/O adapter node has substantially the same communication capability as any host processor node in SAN 100.

In exemplary embodiments, the SAN 100 shown in FIG. 1 supports channel semantics and memory semantics. Channel semantics is sometimes referred to as send/receive or push communication operations. Channel semantics are the type of communications employed in a traditional I/O channel where a source device pushes data and a destination device determines a final destination of the data. In channel semantics, the packet transmitted from a source process specifies a destination processes' communication port, but does not specify where in the destination processes' memory space the packet will be written. Thus, in channel semantics, the destination process pre-allocates where to place the transmitted data.

In memory semantics, a source process directly reads or writes the virtual address space of a remote node destination process. The remote destination process need only communicate the location of a buffer for data, and does not need to be involved in the transfer of any data. Thus, in memory semantics, a source process sends a data packet containing the destination buffer memory address of the destination process. In memory semantics, the destination process previously grants permission for the source process to access its memory.

Channel semantics and memory semantics are typically both utilized for I/O and interprocessor communications. A typical I/O operation employs a combination of channel and memory semantics. In an illustrative example I/O operation of the distributed computer system shown in FIG. 1, a host processor node, such as host processor node 102, initiates an I/O operation by using channel semantics to send a disk write command to a disk I/O adapter, such as RAID subsystem Target Channel Adapter (TCA) 172. The disk I/O adapter examines the command and uses memory semantics to read the data buffer directly from the memory space of the host processor node. After the data buffer is read, the disk I/O adapter employs channel semantics to push an I/O completion message back to the host processor node.

In exemplary embodiments, the distributed computer system shown in FIG. 1 performs operations that employ virtual addresses and virtual memory protection mechanisms to ensure correct and proper access to all memory. Applications running in such a distributed computer system are not required to use physical addressing for any operations.

U.S. patent applications Ser. No. 11/621,632, entitled "Low Latency Send Queues in I/O Adapter Hardware", filed Jan. 9, 2007, and Ser. No. 11/855,401, entitled "Adaptive Low Latency Receive Queues" and Ser. No. 11/855,453, entitled "Adaptive Low Latency Receive Queues", filed concurrently herewith, and Pub No. US 2005/0100033 entitled "InfiniBand® General Services Queue Pair Virtualization for Multiple Logical Ports on a Single Physical Port" filed Nov. 6, 2003; and Pub No. US 2005/0018669 entitled "InfiniBand® Subnet Management Queue Pair Emulation for Multiple Logical Ports on a Single Physical Port" filed Jul. 25, 2003; and Pub No. US 2005/0144313 entitled "InfiniBand® Multicast Operation in an LPAR Environment" filed Nov. 20, 2003; and Pub No. US 2004/0202189 entitled "Apparatus, System and Method for Providing Multiple Logical Channel Adapters Within a Single Physical Channel Adapter in a System Area Network" filed Apr. 10, 2003, are assigned to the same assignee hereof, International Business Machines Corporation of Armonk, N.Y. all of which are incorporated herein by reference.

Figure 2:
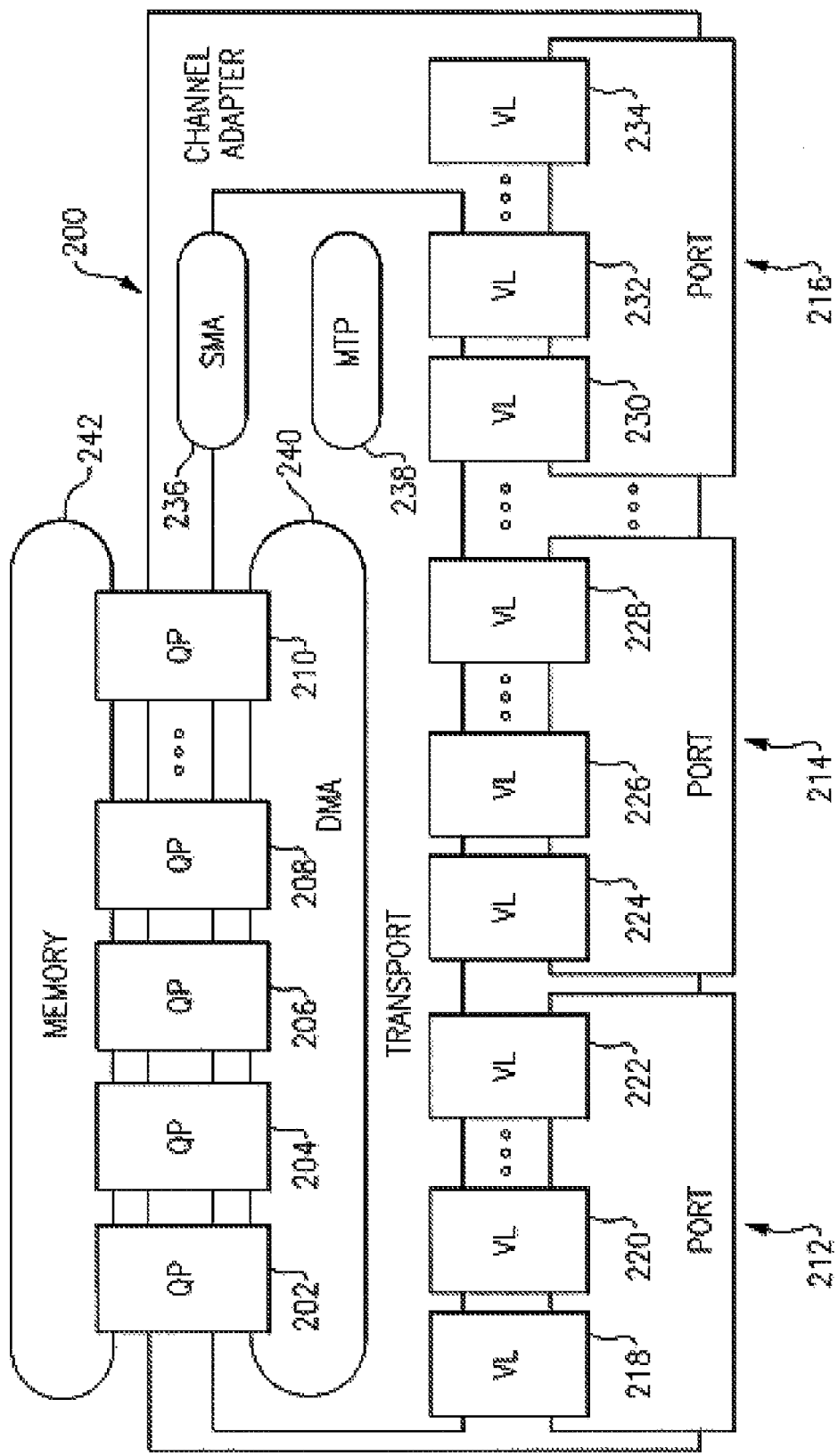
FIG. 2 is a prior art diagram of a host channel adapter that is part of an exemplary operating environment for embodiments of the present invention.

With reference now to FIG. 2, a prior art diagram of an HCA 200 is depicted. HCA 200 shown in FIG. 2 includes a set of QPs 202-210, which is used to transfer messages to the HCA ports 212-216. Buffering of data to HCA ports 212-216 is channeled through virtual lanes (VL) 218-234 where each VL has its own flow control. Subnet manager configures the channel adapter with the local addresses for each physical port, i.e., the port's local identifier (LID). Subnet manager agent (SMA) 236 is the entity that communicates with the subnet manager for the purpose of configuring the channel adapter. Memory translation and protection (MTP) 238 is a mechanism that translates virtual addresses to physical addresses and validates access rights. Direct memory access (DMA) 240 provides for DMA operations using memory 242 with respect to QPs 202-210.

A single channel adapter, such as the HCA 200 shown in FIG. 2, can support thousands of QPs. By contrast, a TCA in an I/O adapter typically supports a much smaller number of QPs. Each QP consists of two work queues, a send queue (SQ) and a receive queue (RQ). The SQ is used to send channel and memory semantic messages. The RQ receives channel semantic messages. A consumer calls an operating system specific programming interface, which is herein referred to as a "verbs interface", to place work requests (WRs) onto a work queue.

Figure 3:
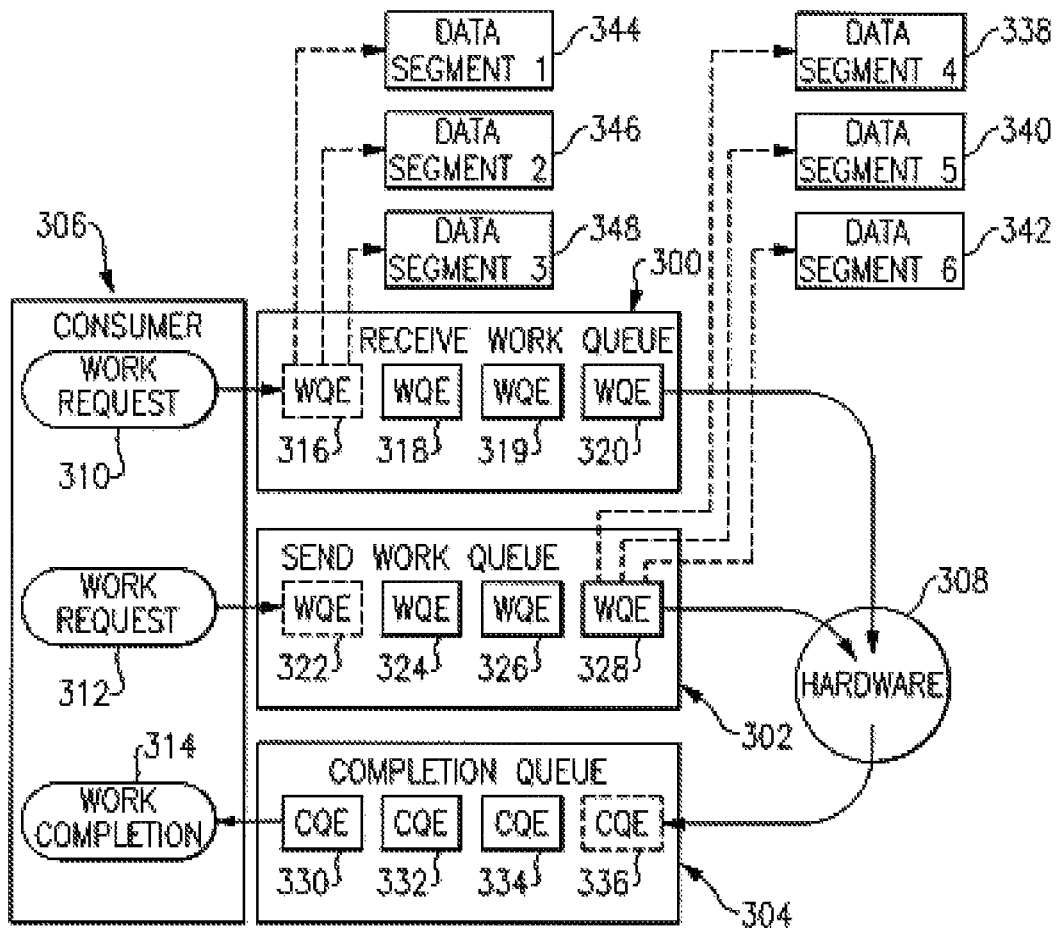
FIG. 3 is a prior art diagram illustrating processing of work requests that is part of an exemplary operating environment for embodiments of the present invention.

With reference now to FIG. 3, a prior art diagram illustrating processing of work requests is depicted. In FIG. 3, RQ 300, SQ 302, and completion queue (CQ) 304 are present for processing requests from and for consumer 306. These requests from consumer 306 are eventually sent to hardware 308. In this example, consumer 306 generates work requests 310 and 312 and receives work completion 314. As shown in FIG. 3, work requests placed onto a work queue are referred to as work queue elements (WQEs).

SQ 302 contains WQEs 322-328, describing data to be transmitted on the SAN fabric. RQ 300 contains WQEs 316-320, describing where to place incoming channel semantic data from the SAN fabric. A WQE is processed by hardware 303 in the HCA. Each QP is managed through a QP context, which is a block of information that pertains to a particular QP, such as the current WQEs, Packet Sequence Numbers, transmission parameters, etc.

The verbs interface also provides a mechanism for retrieving completed work from CQ 304. As shown in FIG. 3, CQ 304 contains completion queue elements (CQEs) 330-336. CQEs contain information about previously completed WQEs. CQ 304 is used to create a single point of completion notification for multiple QPs. A CQE is a data structure on a CQ that describes a completed WQE. The CQE contains sufficient information to determine the QP and specific WQE that completed. A CQ context is a block of information that contains pointers to length, and other information needed to manage the individual CQs.

Example WRs supported for the SQ 302 shown in FIG. 3 are as follows. A send WR is a channel semantic operation to push a set of local data segments to the data segments referenced by a remote node's receive WQE. For example, WQE 328 contains references to data segment 4 338, data segment 5 340, and data segment 6 342. Each of the send WR's data segments contains a virtually contiguous memory space. The virtual addresses used to reference the local data segments are in the address context of the process that created the local QP.

In exemplary embodiments, RQ 300 shown in FIG. 3 only supports one type of WQE, which is referred to as a receive WQE. The receive WQE provides a channel semantic operation describing a local memory space into which incoming send messages are written. The receive WQE includes a scatter list describing several virtually contiguous memory spaces. An incoming send message is written to these memory spaces. The virtual addresses are in the address context of the process that created the local QP.

For interprocessor communications, a user-mode software process transfers data through QPs directly from where the buffer resides in memory. In exemplary embodiments, the transfer through the QPs bypasses the operating system and consumes few host instruction cycles. QPs permit zero processor-copy data transfer with no operating system kernel involvement. The zero process-copy data transfer provides for efficient support of high-bandwidth and low-latency communication.

When a QP is created, the QP is set to provide a selected type of transport service. In exemplary embodiments, a distributed computer system implementing the present invention supports four types of transport services: reliable connection, unreliable connection, reliable datagram, and unreliable datagram (UD) service.

Figure 4:
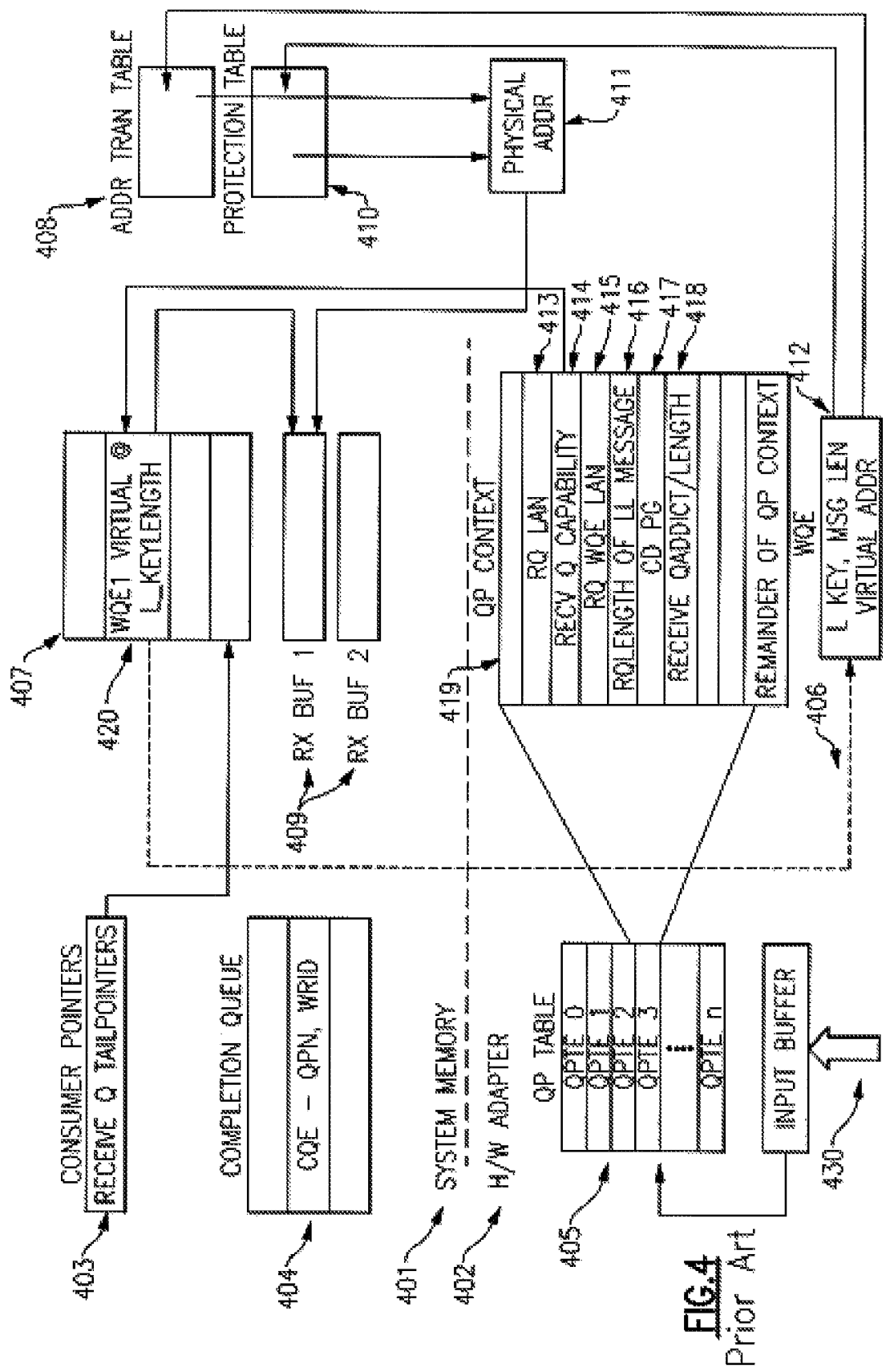
FIG. 4 illustrates prior art standard receive queue operation.

With reference now to FIG. 4, a prior art diagram illustrating standard QP processing for handling message reception is depicted. Shown below the dotted line are parts of an InfiniBand® channel adapter 402, frequently referred to simply as "hardware" herein, which is typically in the form of an adapter card inserted into the host computer system via an adapter slot configured in the host system for the purpose of coupling the adapter to the host system. Above the dotted line is system side memory 401 structured to hold a receive queue 407, receive buffers 409, tail pointer 403, tables for generating addresses 408 and 410, and CQE information 404. The sequence of operations for a standard RQ is as follows: an incoming message packet 430 triggers the RQ process. The packet's header contains a QP number, among other header information, to identify the target QP in the adapter. The adapter looks up the QP number in table 405 and consults the QP Context 419 of that QP. The Context contains a RQ Tail Pointer 414 which identifies a WQE 420 in the system memory RQ 407 for that packet. The adapter then fetches this WQE (dotted line 406) which contains L Key, Virtual Addr, and Msg Len data that are used to locate a buffer 409 in memory where the packet's payload will be stored. The L Key and Virtual Address Information 412 is used to access the Addr Translation Table 408 and Protection Table 410 in memory which generates a physical address 411 for the adapter of the receive buffer 409 in system memory where the payload is to be stored. After the adapter stores the payload in the receive buffer Rx Buf 1 a CQE is stored by the adapter in the Completion Queue which notifies the system software that a data message has been received and stored. The CQE includes a QP number (QPN) which identifies which RQ the message was received in. The CQE also includes a work request ID (WRID) which identifies the WQE 420 that was just processed which, in turn, identifies the buffer Rx Buf 1 where the received message is stored. It will be noted that already there have been several time consuming communications between the system memory and the hardware to store an incoming message, e.g., fetching WQE, generating physical address.

Figure 5:
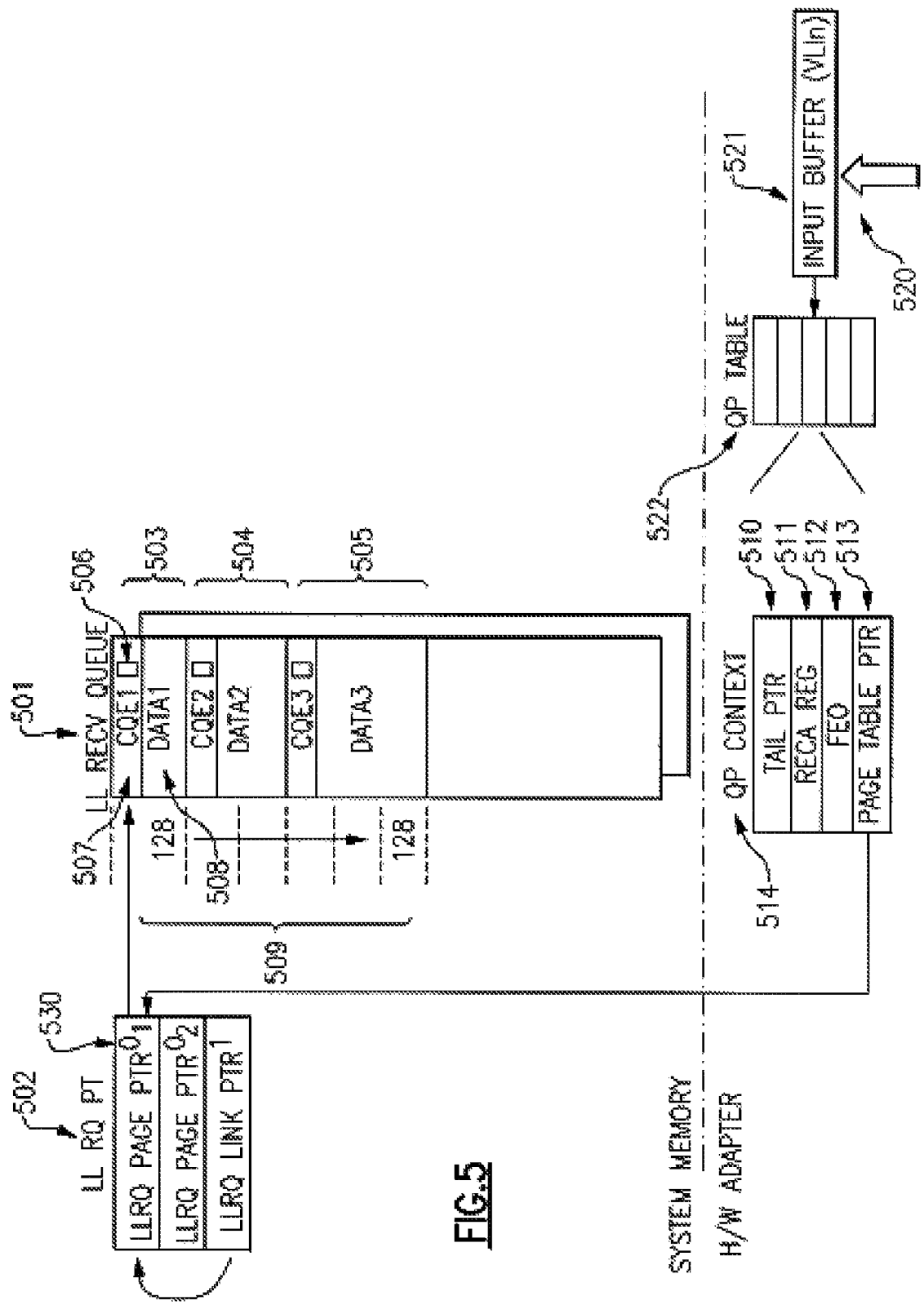
FIG. 5 illustrates an improved receive queue configuration according to an embodiment of the invention.

With reference to FIG. 5, a diagram illustrating an improved apparatus and method for implementing a low latency receive queue (LLRQ) 501 of the prior art is depicted. The LLRQ 501 is structured in system memory containing a number of 128 byte slots 509, e.g. 503, for CQE+data messages. There are typically several LL RQs per port in system memory. Each received message in an RQ comprises a 16 byte CQE field 507, although the leading CQE field could have any preselected size, with the remainder 506 for holding data. Some of the data in the CQE is obtained from the incoming packet header by the adapter, such as Remote LID, identifying a sending device, and Remote QP number, identifying a remote QP of the sending device. If the payload data comprises 112 bytes or less, it will occupy one of these standard slots, such as 503. However, if the data portion is larger than 112 bytes, then additional contiguous slots can be used for holding the data portion, as exemplified by Data2 (an extra 128 bytes) in data message 504 and Data3 (two extra slots) in data message 505. The CQE+message data is transferred by the adapter to the depicted low latency receive queue 501.

The adapter recognizes that the system side is configured as an LL RQ when it obtains the QP Context 514 (or 419) information based on the QP number in the incoming message 520. The adapter then builds, for example, a 128 byte low latency message 503 containing a CQE 507 and payload data 508 for a single transfer over the system bus without undertaking the extra steps of fetching the corresponding WQE, address translation, etc., as in the prior art procedure. The adapter accomplishes this build by obtaining the QP number from an incoming packet 520 stored in a receive buffer 521. The QP number is used to access the QP Table 522 which contains QP Context Information 514 for building the CQE. It should be noted that all low latency messages can be dedicated to a single VL. This is more efficient in conjunction with the present invention because standard longer messages in the same VL may cause waiting low latency messages to be unnecessarily delayed. Well known front end hardware would initially receive incoming messages and steer the low latency messages to the buffer 521 that is implemented as a dedicated Virtual Lane input (VLin) buffer. More efficient processing is also achieved because the VLin buffer identifies incoming messages as low latency, rather than by obtaining the QP number of the incoming packet and fetching its corresponding QP Context information. This would allow a dedicated low latency receive engine to identify the receive message as requiring low latency processing. There may be several VLin buffers in a hardware adapter for processing incoming messages, depending on the system's processing power, as well as several hardware adapters connected to the host system.

Although an example embodiment slot size of 128 bytes is illustrated herein, slots of any size may be constructed. It may be advantageous to select a slot size corresponding to a standard cache line of the computer system that implements the present invention. The Power Architecture™, owned and manufactured by IBM Corp., utilizes 128 byte cache lines. The particular embodiment described herein will, therefore, include reference to 128 byte transfers from system memory, however, the invention is not limited to such an architecture and can be implemented in architectures having standard cache lines of different length.

In the preferred embodiment of FIG. 5, the CQEs are shown each starting at 128 byte boundaries 509. Each CQE contains a CQE valid bit 506 which, when it's set, tells the system that a valid data message is entirely received in the RQ. The CQE also defines the length of its data which is used by the system to identify on which 128 boundary the next CQE begins. Hence, it is important that the valid bit in the next CQE (e.g. CQE 2) be cleared first (e.g. set to logical "0") before the valid bit for the present CQE (e.g. CQE 1) is set (e.g. logical "1"). The data for the present CQE must be visible to the processor, for example, in the system memory, entirely before its valid bit is set. The valid bit indicates to the system that the data for the message is received and can be read and, together with the message length information, where the next CQE begins.

The adapter needs to know how many received messages the system has processed in order to avoid overrunning the RQ. The Free Entry Count Adder (FECA) 511 is a register in the adapter's QP Context 514. A memory mapped I/O (MMIO) store to this register in the QP context causes the hardware to add the number stored to the FEC. The FEC 512 is initialized to the number of 128 byte slots in the RQ. As the adapter stores messages to the RQ it decrements the FEC count by the number of slots it consumes. As the system processes a message, 503, 504, or 505, and frees up slots it will store a 1, 2, or 3, respectively, to the FECA causing the hardware to increment the FEC accordingly. Optionally, the system can process all these messages first, then store a 6 to the FECA. If a message is received that would consume more slots than are available, as indicated by the FEC, the UD packet is silently dropped. This silent drop will not consume any slots.

The hardware uses physical addresses to point to the pages that make up the RQ in the system memory, a separate address for each page, while the tail pointer 510 increments within a page. The hardware uses the page table 502 in system memory that contains page table pointers which reference the pages that make up the receive queue. When the hardware reaches the page boundary it fetches the next entry in the page table 502 which gives the address of the next page in the queue. Then the tail pointer 510 is updated with the new entry and it works its way down the page. Embedded in each page table entry is a link bit 530 set in the pointer, to 0 or 1, so that it knows when it reaches the end of the page table to wrap back to the first page in the queue. Using 4K pages the page boundaries can be hit quickly, with an extra fetch across the bus each time for fetching the next page pointer. Hence, large pages, such as 16M, are more efficient.

Figure 6:
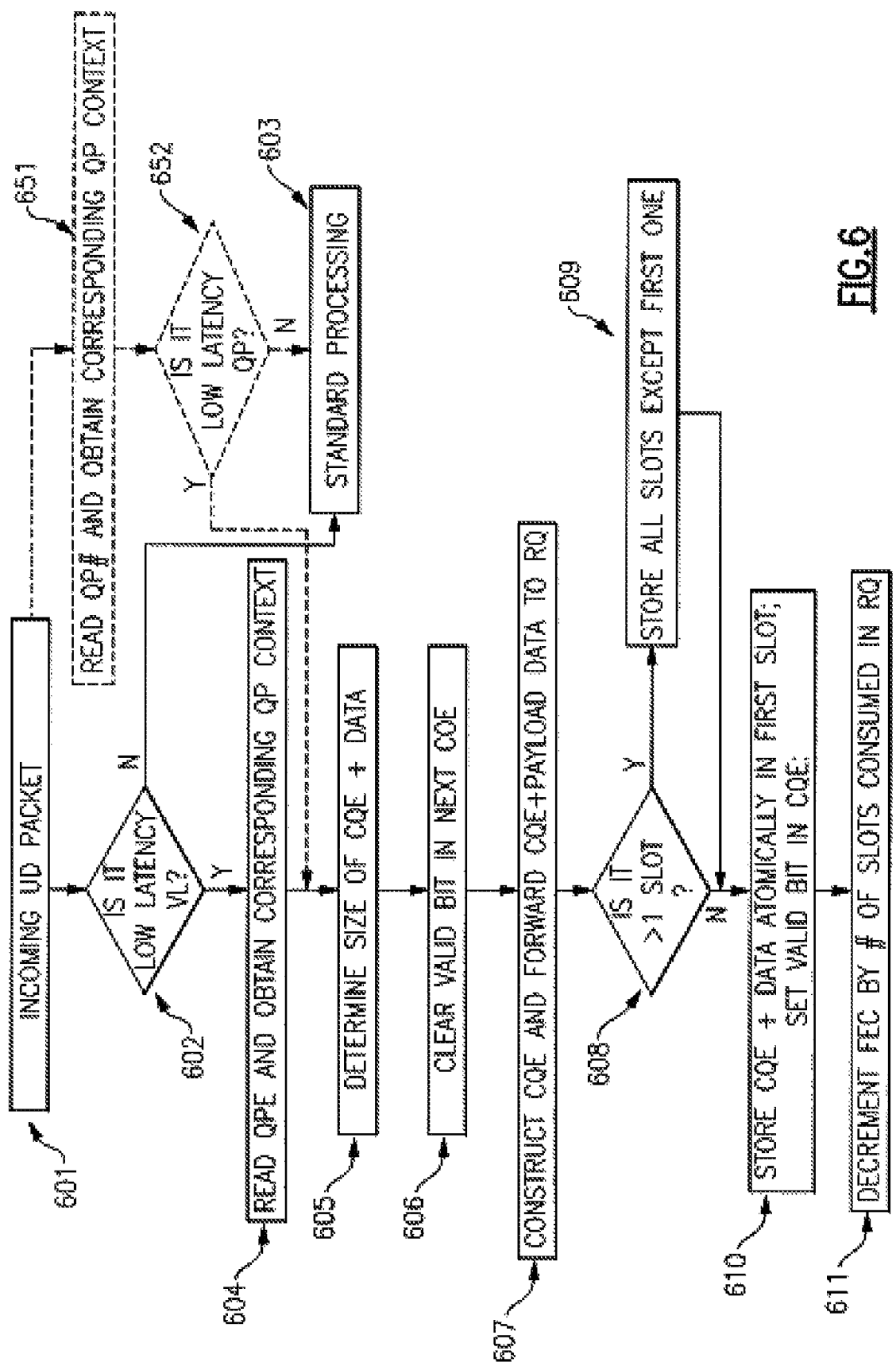
FIG. 6 illustrates a flow chart of an embodiment of the present invention.

With reference to FIG. 6, a flowchart showing implementation of a method of the present inventive embodiment is depicted. At step 601 an incoming UD packet arrives at front end hardware. At step 602 a determination is made whether the packet is received in a dedicated low latency Virtual Lane. If it is not, then the packet is processed in a standard fashion 603. If it is a low latency packet received in the low latency VLin buffer then, at step 604, the QP number is read and the corresponding QP Context information is obtained for forming the CQE portion of the data message. At step 605 the size of the CQE and data portions is determined from packet header information. At step 606, the adapter clears the valid bit in the next CQE, based on the known size of the current received date message. At step 607 the CQE is constructed based on the QP Context information then the CQE and payload data is forwarded to the RQ. At step 608, if the CQE+data is larger than one slot then the data portion destined for a slot or slots other than the first slot is stored there, then at step 610 the data and CQE destined for the first slot is stored atomically in the first slot and the CQE Valid bit is set. If at step 608 it is determined that the CQE+payload data fits in one slot then at step 610 the CQE and data is stored atomically in the first slot and the CQE valid bit is set. At step 611 the FEC is decremented according to the number of slots consumed in the RQ by the CQE and data.

An optional method for determining whether an incoming packet is to be received in the low latency receive queue is also illustrated in the flow chart of FIG. 6 in dashed lines. After an incoming packet is received at step 601, the adapter obtains its corresponding QP Context information based on the packet's QP number at step 651. The Context information identifies the incoming packet as a low latency UD packet or as a standard packet. At step 652, if the incoming packet is a standard packet, then it is processed in a standard fashion 603. If it is a low latency UD packet, then the processing continues at step 605, as described above, wherein the size of the CQE and data portions is determined from packet header information. Processing then continues from step 605 as described above.

Figure 7:
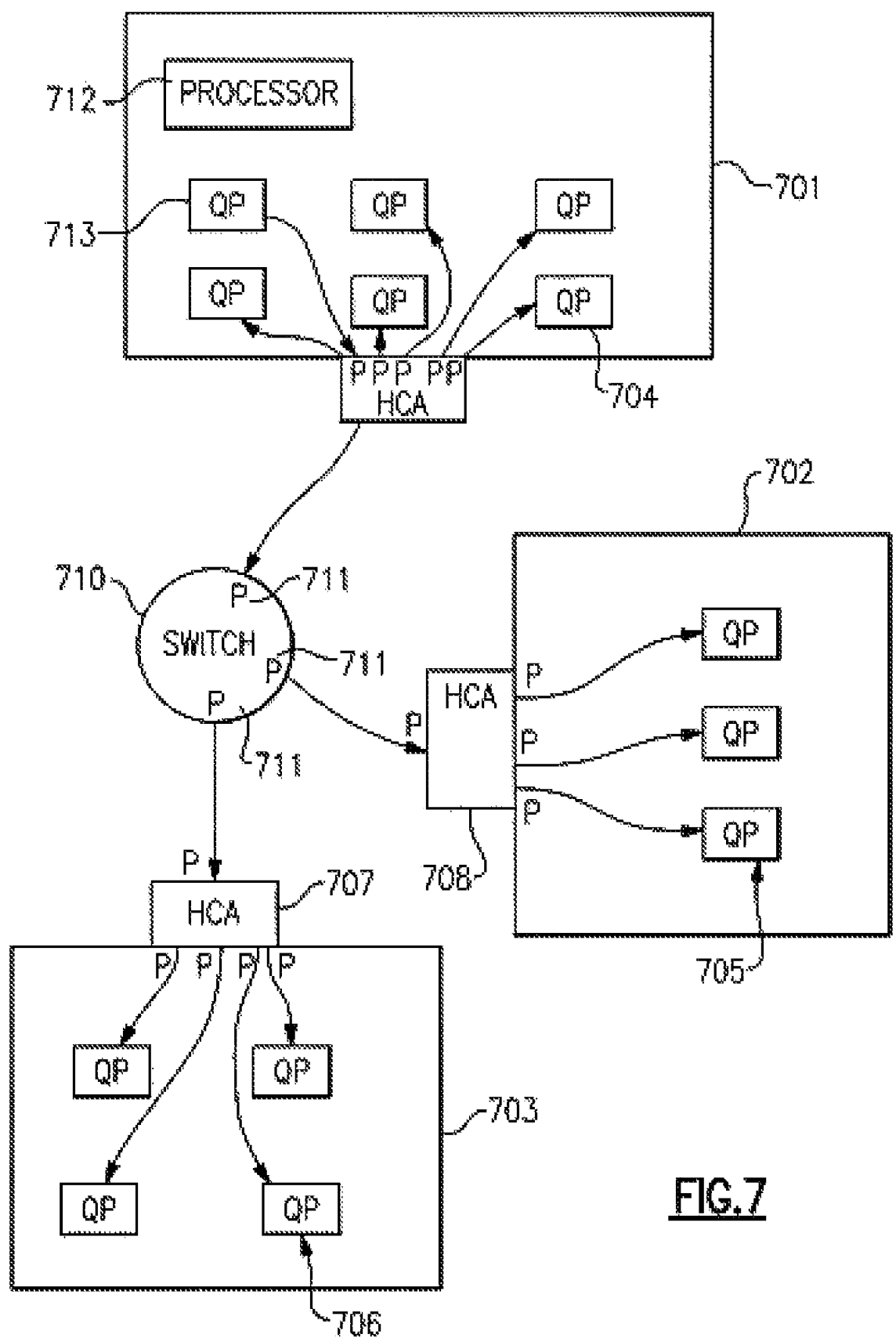
FIG. 7 illustrates an example multicast operation according to the prior art.

FIG. 7 illustrates an implementation of multicasting in a logical HCA LPAR environment. Illustrated is an example two port physical HCA comprising multiple logical HCAs and a logical switch per physical port. Each logical HCA includes ports each for coupling to a logical switch. The LPARs each include a running OS that manages one or more QPs each corresponding to a logical HCA. The LPARs share the processing resources on the system and can access the logical HCAs for processing tasks on their corresponding QPs. Thus, the processors illustrated in FIG. 7 can each access a number of LPARs. A multicast message can be sent from any LPAR to one or more other LPARs on the system using the logical HCAs and switches in the physical HCA, simultaneously sending the message through one of the physical HCA ports to a network switch which can then replicate and send the message to more switches or end nodes, as the case may be.

Within a physical HCA are configured several logical HCAs each owned by a particular LPAR running on the system, with each LPAR owning at least one QP for receiving and sending messages. The QPs are thus assigned to a particular logical HCA. In order to target messages to the right QP, the view presented at the physical port shows a logical switch which recognizes LIDs in incoming packets. This is accomplished by visualizing host channel adapters in such an LPAR environment and by associating QPs with LIDs, as explained in more detail below.

Figure 8:
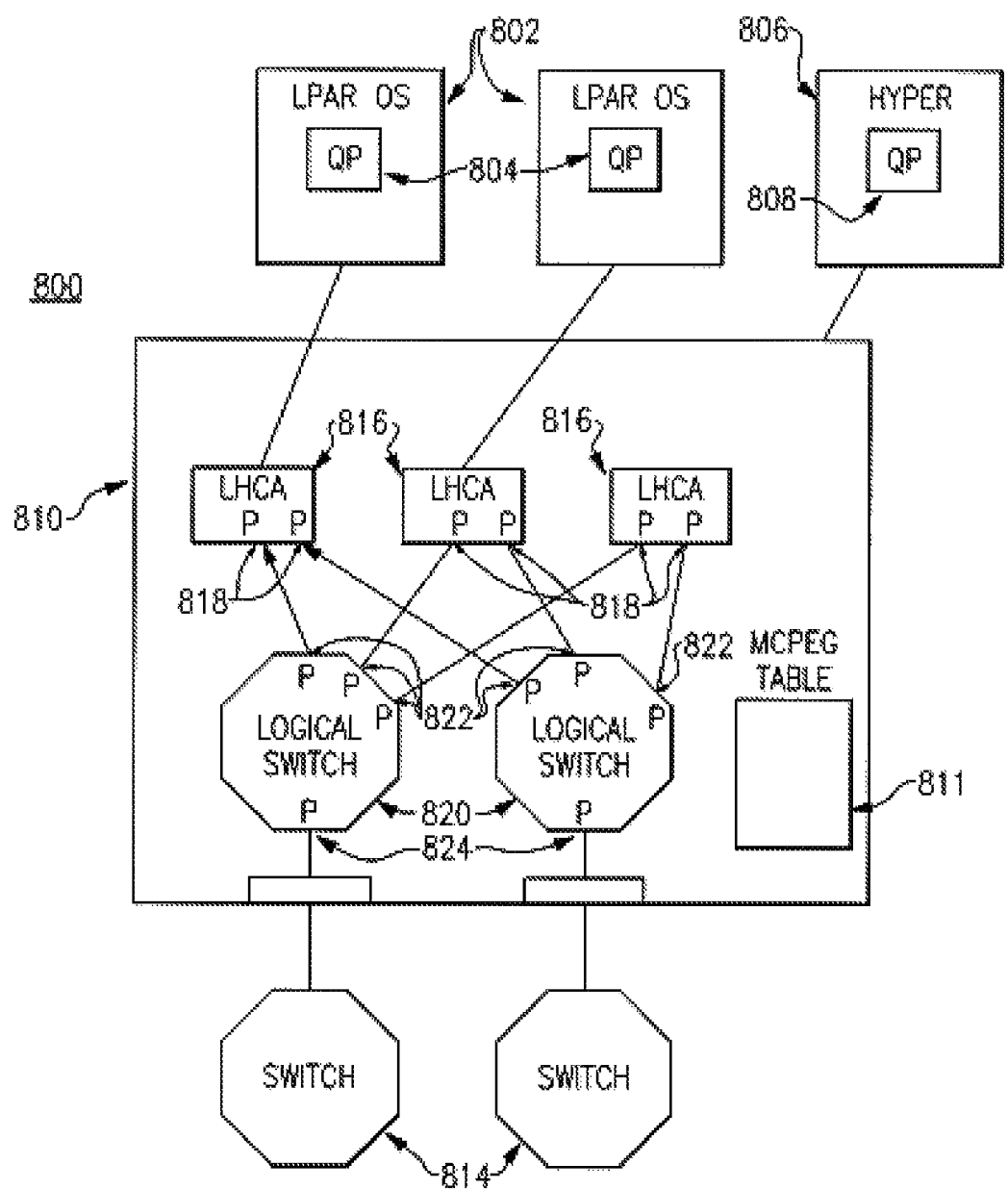
FIG. 8 illustrates another multicast operation according to an embodiment of the present invention.

FIG. 8 is a diagram illustrating a deployment of a preferred embodiment of the present invention. LPAR data processing system 800 hosts a number of logical partitions (LPARs) 802. Each of LPARs 802 may support one or more InfiniBand® queue pairs (QPs), such as QP 804. LPAR data processing system 800 also supports an InfiniBand® physical host channel adapter (HCA) 810, which is shared among LPARs 802 and which interfaces LPAR data processing system 800 to external switching fabric 814. HCA 810 supports its own set of QPs.

Each LPAR 802 includes a logical HCA 816, each logical HCA 816 having one or more logical ports 818 through which the partitions interface with logical switch 820. Logical switch 820 includes a plurality of ports 822 for interfacing with the logical HCAs. Logical switch 820 also interfaces with physical port 824, which itself interfaces with external fabric 814.

Hypervisor 806, which is the supervisory firmware in charge of managing LPARs 802, also provides an interface from HCA 810 to LPARs 802. Hypervisor 806 supports a QP 808, which is used to relay packets between the LPARs 802 and HCA 810. In effect, the hypervisor and its QP 808 perform the function of a switch's Multicast Forwarding table 811, and also the HCA's replication of packets to multiple QPs that can be members of a multicast group. In this preferred embodiment, hypervisor 806 assumes some of the protocol handling responsibilities of HCA 810 in particular situations in which multicast packets are received for delivery to any of LPARs 802. The Hypervisor assumes some of the protocol checking because it needs to handle these multicast packets on behalf of multiple logical HCAs/logical ports, thus the flexibility of software is advantageous. The hypervisor maintains a multicast table 811, which contains information on the various multicast groups to which LPAR data processing system 800 may belong (or, more specifically, to which any Logical Ports 818 and QPs 804 of Logical HCAs 816 may belong).

In particular, a preferred embodiment of the present invention provides a number of mechanisms that, in selected cases, transfer the responsibility for certain protocol checking operations from HCA 810's hardware to trusted firmware or operating system code, such as hypervisor 806. At the same time, for packets not associated with multicast, the hardware retains the protocol checking responsibility, thus maintaining significantly better overall performance than if the total responsibility for protocol checking were transferred to firmware or software. Further, the invention provides hardware assists to improve the performance of the checking that is transferred to firmware of software code. A number of these features from the prior art are listed below:

a. A scalable hardware multicast table (e.g., multicast table 811) that can be sized to fit hardware implementations, but that can also be extended to support more multicast groups by selectively employing hooks to hypervisor firmware (e.g., hypervisor 806) or a trusted operating system.

b. Means to override Source Logical Identifier (SLID) and Source Queue Pair Number (Source QP#), normally supplied by the hardware based upon the originators identity, in a Work Queue Entry (WQE) to perform transparent packet replication and retransmission. This allows trusted code managing a QP to set the SLID and Source QP# of a packet to a value other than its own.

c. An option to disable hardware Queue Key (Q_Key) checking to allow a QP to operate on multicast flows from more than one multicast group.

d. Techniques that enable the checking of Partition Keys (P_Keys) against a variety of valid P_Keys or to disable P_Key checking. Both allow a QP to operate on multicast flows from more than one multicast group.

e. Detection of focal recipients of multicast packets supported by the same hardware.

f. The use of internal loopback data paths to aid in packet replication and delivery of multicast packets destined to recipients supported by the adapter.

g. A 'Force Out' mechanism that disables internal loopback checking and allows direct transmission of a packet onto a fabric.

Figure 9:
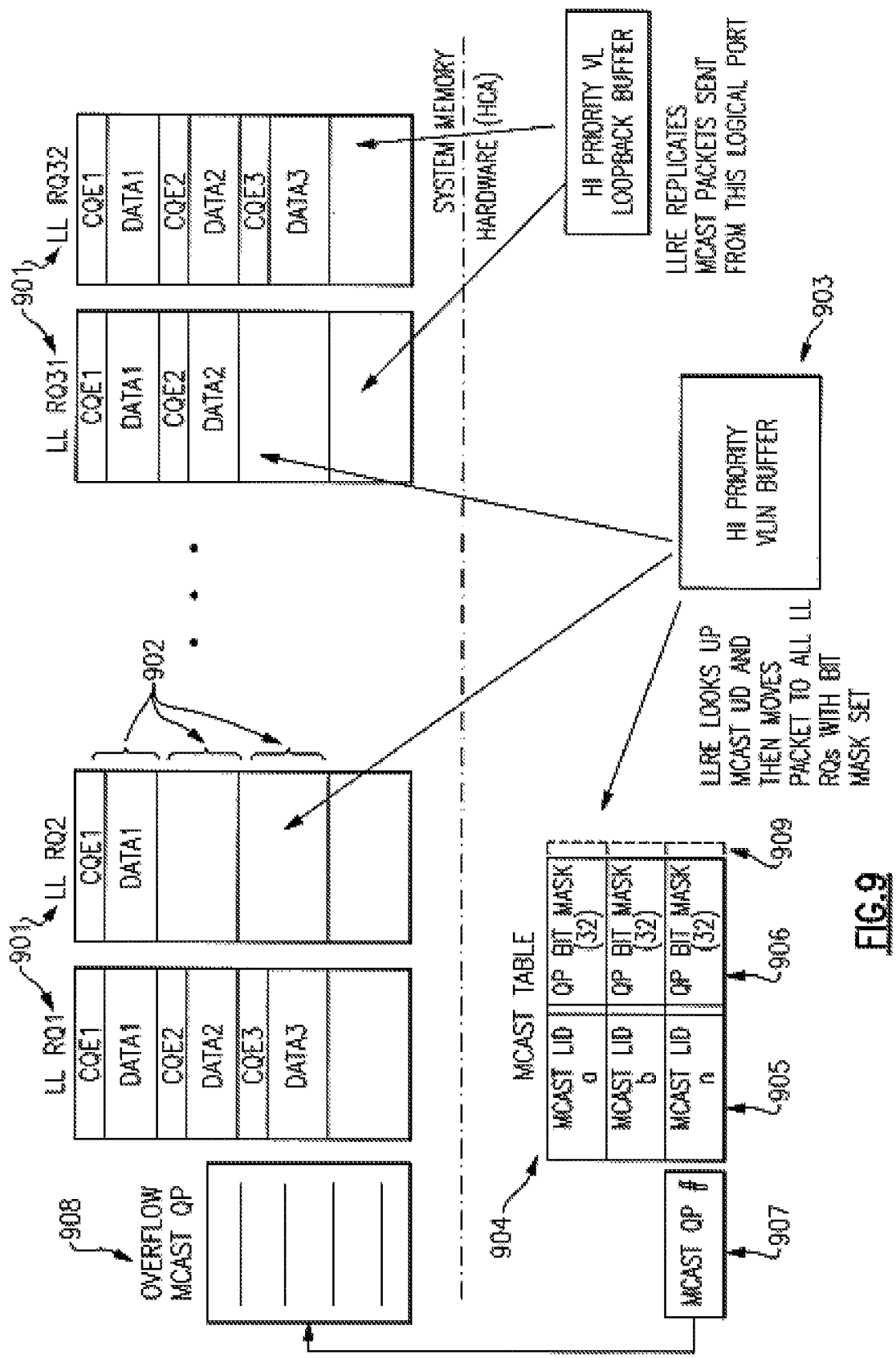
FIG. 9 illustrates a low latency hardware multicast receive configuration according to an embodiment of the present invention.

With reference now to FIG. 9, a diagram of Low Latency RQs 901 compatible with a Low Latency Mcast implementation is depicted. The RQ embodiments illustrated in FIG. 9 and described herein are consistent with those illustrated in FIG. 5. What will now be described is a mechanism for efficiently replicating received multicast packets in the HCA (Hardware) and sending them to multiple destination RQs with very low latency. The RQs 901 each comprise a CQE preceding a data portion which are stored in uniformly sized slots 902 in the RQs 901.

The process begins when a packet is received in the high priority VLin buffer 903. A multicast packet is identified by the packet's LID. The IB standard defines the upper quarter of the LID address space as multicast and so this is used by the hardware to identify the packet as a multicast packet. After reading the received packet header, the hardware looks up its LID in the multicast table 904. If a matching LID is found within table entries 905, its corresponding entry 906, a QP bit mask, identifies which of the QPs are to receive a replicated copy of that packet. For example, a thirty two bit field in the QP bit mask may correspond to thirty two QPs in the host, with specific bits each set for a targeted QP. The packet is held in the VL in buffer until a copy of the packet is sent, in a single transfer for each LL RQ as described above, to each designated receiving QP, then it's released.

InfiniBand® defines a construct known as "Multicast Groups" which is used as a configuration process for associating QPs to particular defined groups as part of an initialization process. Allocating a QP to a particular group entails setting its corresponding bit in the stored bit mask 906. Each IB multicast group has associated with it a multicast LID and a GRH. As explained above, the present invention uses the multicast LID to identify a corresponding bit mask for targeting QPs that wilt receive the data message.

An embodiment of the present invention includes a method for handling an overflow situation where a received message must be delivered to all the QPs in the group identifiable by the bit mask and also identifies additional QPs present on the host system. The target group is somewhat larger than the number of bits in the bit mask. An embodiment of the present invention provides an overflow multicast QP. One way in which the overflow multicast QP is activated occurs when a packet arrives having a LID that is not found in the Mcast table 904. The default operation is to employ a register 907 in the hardware for holding the multicast QP number which points to the over flow Mcast QP 908. The hardware will place the multicast packet on the overflow Mcast QP. The host system or the hypervisor 806 will then identify the packet and its multicast group and perform necessary replication of the packet for distribution to the additional QPs that are members of the multicast group. This software replication operation is slower than the hardware low latency replication, however, increasing the Mcast table size to handle all QPs on the system for incoming packets will also slow down hardware operation. Therefore, the overflow Mcast QP 908 is designed to handle a small percentage of incoming packets that are not in the Mcast table 904 or if more than thirtytwo QPs, or some other maximum number of bit masks, are members of the group.

Another embodiment for indicating that an incoming packet is intended for more than the maximum number of QPs identifiable by the bit masks includes adding an extra bit 909 in the Mcast table for indicating that the incoming packet is intended for all QPs identifiable by the bit mask 906 and also for the Mcast overflow QP 908.

Figure 10:
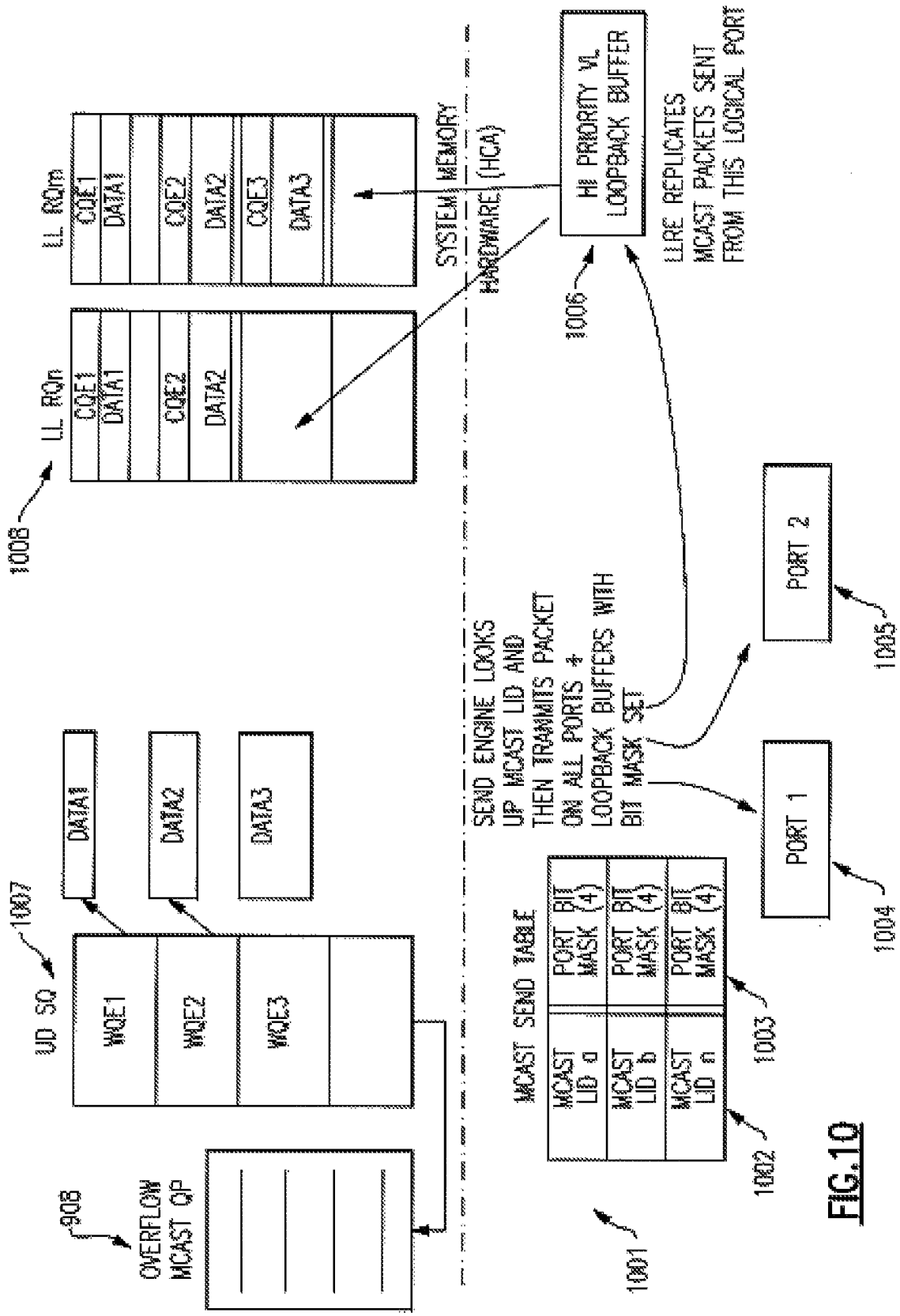
FIG. 10 illustrates a low latency hardware multicast send configuration according to an embodiment of the present invention.

With reference to FIG. 10, illustrated is a two port HCA coupled to an IB fabric (not shown) and to Host System Memory for multicasting data packets. On the sending side, it may be advantageous to replicate locally and to send multiple copies through a loopback path or ports 1004, 1005. The host system contains standard UD SQs 1007 where multicast packets originate. The send side hardware also contains a table 1001 holding Multicast LIDs 1002 each associated with a port bit mask 1003. The sending engine looks at the destination LID of the packet, while the packet is in the send buffer awaiting transmission, to determine that the packet contains a multicast LID, which is looked up in the Mcast send table 1001. That look up provides an associated port bit mask 1003 which indicates whether to transmit the packet on one port or the other or both depending on which bits of the mask are set. The packet might also be transmitted to RQs on the host system via a loopback buffer 1006, which is also indicated by the port bit mask. The VL in buffer and the loopback buffer are both capable of transferring multiple copies of a packet to the RQs. As an example, the hardware might see that the port bit mask indicates that the packet is to be sent out of port 1 1004, and out of port 2 1005, and is to be sent to the loopback buffer 1006. The loopback buffer is coupled to the receive queue processing apparatus depicted in FIG. 9. A packet that is intended for the host system RQs is sent to the loopback buffer and is processed in a similar fashion as described above.

Figure 11:
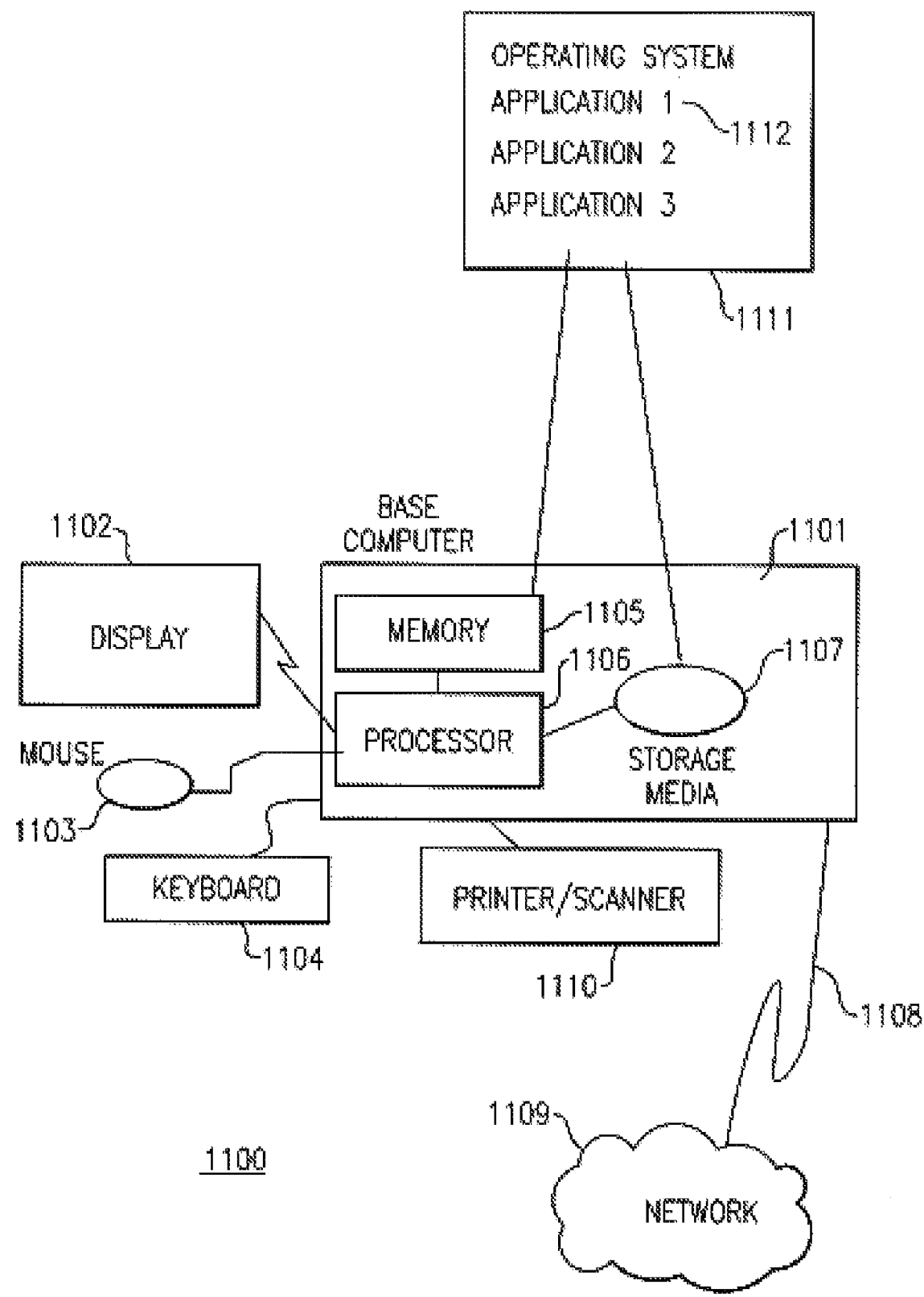
FIG. 11 illustrates an embodiment of a computer system in which the techniques of the present invention may be practiced.

For send packets that are not found in the Mcast send table, an overflow QP is employed similar to the receive side overflow QP. If a packet is not found in the Mcast send table it is sent to the overflow queue and system software, for example, a hypervisor, will determine where the packet is to be sent FIG. 11 illustrates a representative workstation or server hardware system in which the present invention may be practiced. The system 1100 of FIG. 11 comprises a representative computer system 1101, such as a personal computer, a workstation or a server, including optional peripheral devices. The workstation 1101 includes one or more processors 1106 and a bus employed to connect and enable communication between the processor(s) 1106 and the other components of the system 1101 in accordance with known techniques. The bus connects the processor 1106 to memory 1105 and long-term storage 1107 which can include a hard drive, diskette drive or tape drive for example. The system 1101 might also include a user interface adapter, which connects the microprocessor 1106 via the bus to one or more interface devices, such as a keyboard 1104, mouse 1103, a Printer/scanner 1110 and/or other interface devices, which can be any user interface device, such as a touch sensitive screen, digitized entry pad, etc. The bus also connects a display device 1102, such as an LCD screen or monitor, to the microprocessor 1106 via a display adapter.

The system 1101 may communicate with other computers or networks of computers by way of a network adapter capable of communicating 1108 with a network 1109. Example network adapters are communications channels, token ring, Ethernet or modems. Alternatively, the workstation 1101 may communicate using a wireless interface, such as a CDPD (cellular digital packet data) card. The workstation 1101 may be associated with such other computers in a Local Area Network (LAN) or a Wide Area Network (WAN), or the workstation 1101 can be a client in a client/server arrangement with another computer, etc. All of these configurations, as well as the appropriate communications hardware and software, are known in the art.

Figure 12:
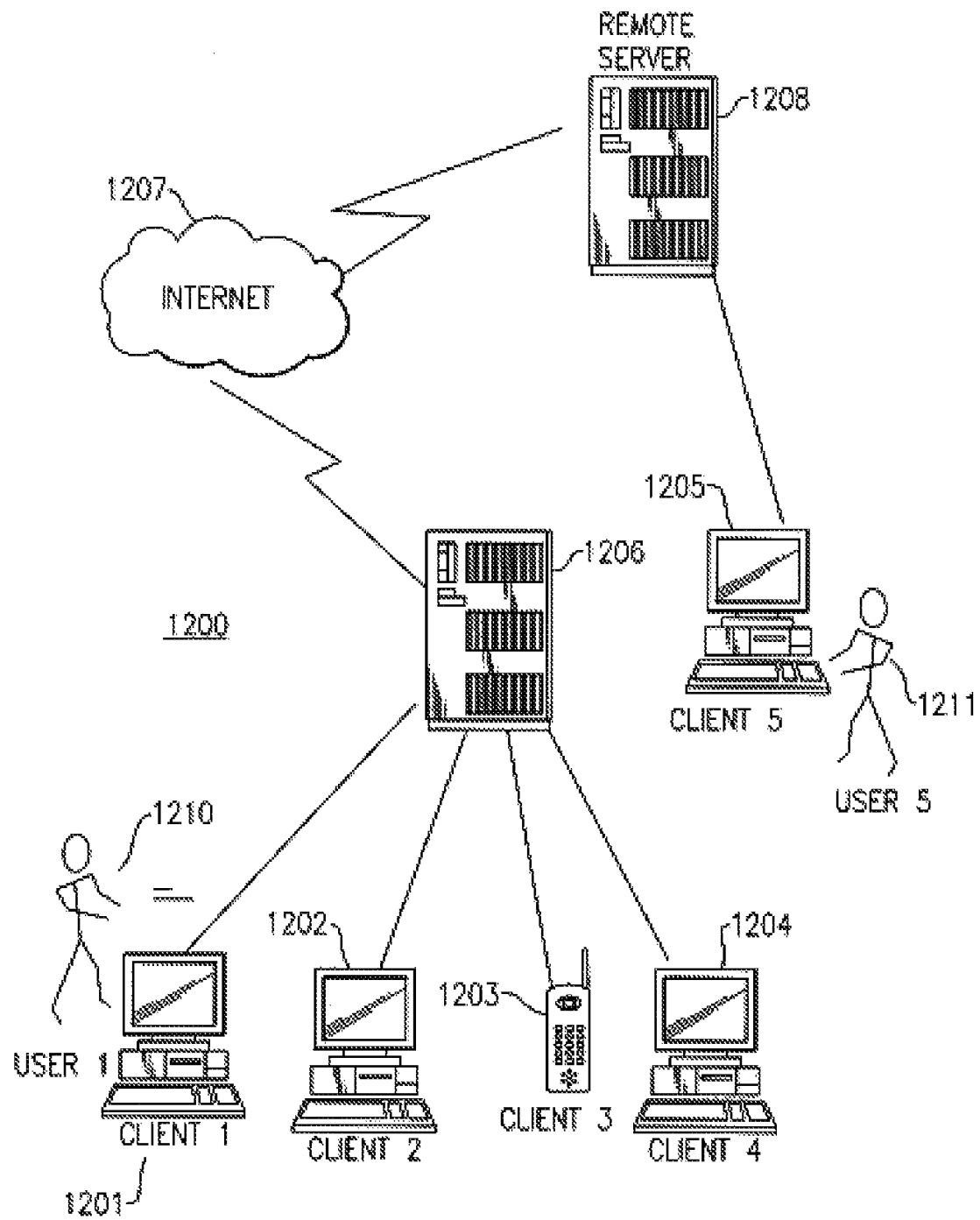
FIG. 12 illustrates an embodiment of a data processing network in which the techniques of the present invention may be practiced.

FIG. 12 illustrates a data processing network 1200 in which the present invention may be practiced. The data processing network 1200 may include a plurality of individual networks, such as a wireless network and a wired network, each of which may include a plurality of individual workstations 1201, 1202, 1203, 1204. Additionally, as those skilled in the art will appreciate, one or more LANs may be included, where a LAN may comprise a plurality of intelligent workstations coupled to a host processor.

Still referring to FIG. 12, the networks may also include mainframe computers or servers, such as a gateway computer (client server 1206) or application server (remote server 1208 which may access a data repository and may also be accessed directly from a workstation 1205). A gateway computer 1206 serves as a point of entry into each network 1207. A gateway is needed when connecting one networking protocol to another. The gateway 1206 may be preferably coupled to another network (the internet 1207 for example) by means of a communications link. The gateway 1206 may also be directly coupled to one or more workstations 1201, 1202, 1203, 1204 using a communications link. The gateway computer may be implemented utilizing an IBM eServer zSeries® Server available from IBM Corp.

Turning to FIG. 11, software programming code which embodies the present invention is typically accessed by the processor 1106 of the system 1101 from long-term storage media 1107, such as a CD-ROM drive or hard drive. The software programming code may be embodied on any of a variety of known media for use with a data processing system, such as a diskette, hard drive, or CD-ROM. The code may be distributed on such media, or may be distributed to users 1210, 1211 (FIG. 12) from the memory or storage of one computer system over a network to other computer systems for use by users of such other systems.

Alternatively, the programming code 1111 may be embodied in the memory 1105, and accessed by the processor 1106 using the processor bus. Such programming code includes an operating system which controls the function and interaction of the various computer components and one or more application programs. Program code is normally paged from dense storage media 1107 to high-speed memory 1105 where it is available for processing by the processor 1106. The techniques and methods for embodying software programming code in memory, on physical media, and/or distributing software code via networks are well known and will not be further discussed herein.

Alternative Embodiments

It should be noted that the present invention, or aspects of the invention, can be embodied in a computer program product, which comprises features enabling the implementation of methods described herein, and which, when loaded in a host computer system or in an adapter, is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form. For the purposes of this description, a computer program product or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CO-ROM), compact disk-read/write (CD-RAW) and DVD.

Devices described herein that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may alternatively be embodied by one or more other devices which are not explicitly described as having such functionality/features. Thus, other embodiments need not include the device itself.

Therefore, the foregoing description of the embodiments has been presented for the purposes of illustration and description. It is not intended to be exhaustive or to limit the embodiments to the precise form disclosed. Many modifications and variations are possible in light of the above teaching.

We claim:

1. A system for receiving a packet over a computer network-comprising a plurality of nodes, each node comprising one or more queue-pairs of a plurality of queue pairs, each node further comprising one or more network adapters for connecting the computer network with the node, the system comprising:

a network adapter of a first node of the plurality of nodes configured to access a plurality of local queue-pairs of the plurality of queue pairs, the network adapter capable of having a multi-cast lookup table comprising a plurality of entries, each entry comprising an LID and a plurality of queue identifiers for identifying said one or more local predetermined receive queues of said plurality of local queue-pairs;

wherein the system is capable of performing a method comprising:

decoding an identifier (ID) field of said packet, to determine if the packet is a multi-cast packet, wherein a multi-cast packet is a packet destined for receive queues of a plurality of predetermined queue-pairs of the plurality of queue pairs, the plurality of predetermined queue-pairs comprising one or more local predetermined queue-pairs of the plurality of local queue-pairs, the packet comprising a payload;

based on the decoding step, in response to the packet being a multi-cast packet, obtaining a Local ID (LID) field of the packet;

based on the obtained Local ID field and said multi-cast lookup table, identifying one or more local predetermined receive queues of said plurality of local queue-pairs, said identifying comprising:

finding a Local ID entry in said multi-cast lookup table corresponding to the obtained Local ID field, the Local ID entry comprising said local ID field, an overflow indicator, and a plurality of bits, each bit of the plurality of bits representing a unique one of said plurality of local queues;

when the overflow indicator indicates an overflow condition, accessing an overflow table comprising overflow entries;

based on the accessed overflow entry, determining additional local predetermined receive queues for storing said payload; and selecting said identified one or more local predetermined receive queues based the values of said plurality of bits; and storing the payload of the packet in said identified one or more local predetermined receive queues.

2. The system according to claim 1, wherein the network adapter capable of performing a method further comprises storing the payload in receive queues in node memory.

3. The system according to claim 2, wherein said first node further comprises a multi-processor host computer system.

4. A computer program product for performing a method for receiving a packet in a computer network comprising a plurality of nodes, each node comprising one or more queue-pairs of a plurality of queue pairs, each node further comprising one or more network adapters for connecting the computer network with the node, a network adapter of a first node of the plurality of nodes configured to access a plurality of local queue-pairs of the plurality of queue pairs, the network adapter capable of having a multi-cast lookup table comprising a plurality of entries, each entry comprising an LID and a plurality of queue identifiers for identifying said one or more local predetermined receive queues of said plurality of local queue-pairs, the computer program product comprising:
  a storage medium readable by a processing circuit and storing instructions for execution by the processing circuit for performing a method comprising:
    decoding an identifier (ID) field of said packet, to determine if the packet is a multi-cast packet, wherein a multi-cast packet is a packet destined for receive queues of a plurality of predetermined queue-pairs of the plurality of queue pairs, the plurality of predetermined queue-pairs comprising one or more local predetermined queue-pairs of the plurality of local queue-pairs, the packet comprising a payload,
    based on the decoding step, in response to the packet being a multi-cast packet, obtaining a Local ID (LID) field of the packet;
    based on the obtained Local ID field and said multi-cast lookup table, identifying one or more local predetermined receive queues of said plurality of local queue-pairs, said identifying comprising:
      finding a Local ID entry in said multi-cast lookup table corresponding to the obtained Local ID field, the Local ID entry comprising said local ID field, an overflow indicator, and a plurality of bits, each bit of the plurality of bits representing a unique one of said plurality of local queues;
      when the overflow indicator indicates an overflow condition, accessing an overflow table comprising overflow entries;
      based on the accessed overflow entry, determining additional local predetermined receive queues for storing said payload; and
      selecting said identified one or more local predetermined receive queues based the values of said plurality of bits; and
    storing the payload of the packet in said identified one or more local predetermined receive queues.

5. The computer program product according to claim 4, wherein said storing step stores the payload in receive queues in node memory.

6. The computer program product according to claim 5, wherein said first node further comprises a multi-processor host computer system.

7. The computer program product according to claim 4, wherein the steps are performed by logic circuits of said network adapter and not by any microprocessor.

8. The computer program product according to claim 4, wherein the packet is received at a port of the network adapter from a second node of the plurality of nodes of the computer network.

9. The computer program product according to claim 4, further comprising sending the packet to one or more nodes of the plurality of nodes of the computer network by way of a selected port of the network adapter.

10. A computer implemented method for receiving a packet in a computer network comprising a plurality of nodes, each node comprising one or more queue-pairs of a plurality of queue pairs, each node further comprising one or more network adapters for connecting the computer network with the node, a network adapter of a first node of the plurality of nodes configured to access a plurality of local queue-pairs of the plurality of queue pairs, the network adapter capable of having a multi-cast lookup table comprising a plurality of entries, each entry comprising an LID and a plurality of queue identifiers for identifying said one or more local predetermined receive queues of said plurality of local queue-pairs, the method comprising:
  decoding an identifier (ID) field of a packet, to determine if the packet is a multi-cast packet, wherein a multi-cast packet is a packet destined for receive queues of a plurality of predetermined queue-pairs of the plurality of queue pairs, the plurality of predetermined queue-pairs comprising one or more local predetermined queue-pairs of the plurality of local queue-pairs, the packet comprising a payload;
  based on the decoding step, in response to packet being a multi-cast packet, obtaining a Local ID (LID) field of the packet;
  based on the obtained Local ID field and said multi-cast lookup table, identifying one or more local predetermined receive queues of said plurality of local queue-pairs, said identifying comprising:
    finding a Local ID entry in said multi-cast lookup table corresponding to the obtained Local ID field, the Local ID entry comprising said local ID field, an overflow indicator, and a plurality of bits, each bit of the plurality of bits representing a unique one of said plurality of local queues;
    when the overflow indicator indicates an overflow condition, accessing an overflow table comprising overflow entries;
    based on the accessed overflow entry, determining additional local predetermined receive queues for storing said payload; and
    selecting said identified one or more local predetermined receive queues based the values of said plurality of bits; and
  storing the payload of the packet in said identified one or more local predetermined receive queues.

11. The method according to claim 10, wherein said storing step stores the payload in receive queues in node memory.

12. The method according to claim 11, wherein said first node further comprises a multi-processor host computer system.

13. The method according to claim 10, wherein the steps are performed by logic circuits of said network adapter and not by any microprocessor.

14. The method according to claim 10, wherein the packet is received at a port of the network adapter from a second node of the plurality of nodes of the computer network.

15. The method according to claim 10, further comprising sending the packet to one or more nodes of the plurality of nodes of the computer network by way of a selected port of the network adapter.

16. The method according to claim 15, further comprising determining the selected port of a plurality of ports of the network adapter based on a send entry of a multi-cast send table, each send entry comprising an LID and a plurality of port identifiers.

17. The method according to claim 15, wherein sending the packet to one or more nodes of the computer network step further comprises sending the packet within the network adapter of the first node to said one or more focal predetermined receive queues of said plurality of local queue-pairs of the network adapter.

18. The method according to claim 16, wherein the multicast lookup table and the multicast send table are one table.

* * * * *